United States Patent
Abuelsaad et al.

(10) Patent No.: US 9,529,779 B2
(45) Date of Patent: *Dec. 27, 2016

(54) DETECTION AND REPOSITIONING OF POP-UP DIALOGS

(71) Applicant: International Business Machines Corporation, Armonk, NY (US)

(72) Inventors: Tamer E. Abuelsaad, Somers, NY (US); Nimesh Bhatia, San Jose, CA (US); Gregory J. Boss, Saginaw, MI (US); Manuel Silveyra, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 729 days.

This patent is subject to a terminal disclaimer.

(21) Appl. No.: 13/788,875

(22) Filed: Mar. 7, 2013

(65) Prior Publication Data

US 2014/0181638 A1 Jun. 26, 2014

Related U.S. Application Data

(63) Continuation of application No. 13/725,694, filed on Dec. 21, 2012.

(51) Int. Cl.
*G06F 17/00* (2006.01)
*G06F 17/21* (2006.01)

(52) U.S. Cl.
CPC ................... *G06F 17/211* (2013.01)

(58) Field of Classification Search
CPC .................................................... G06F 17/2111
USPC .............. 715/200, 201, 203, 234, 238, 240, 243, 715/247
See application file for complete search history.

(56) References Cited

U.S. PATENT DOCUMENTS

| | | | |
|---|---|---|---|
| 2003/0112278 A1* | 6/2003 | Driskell | G06F 9/4443 715/788 |
| 2006/0271861 A1* | 11/2006 | Yolleck | G06F 17/30873 715/760 |
| 2008/0295025 A1* | 11/2008 | Gyure | G06F 3/048 715/808 |
| 2011/0246880 A1* | 10/2011 | Horton | G06F 9/4446 715/708 |
| 2011/0311408 A1* | 12/2011 | Azimi | B01L 3/5027 422/509 |

(Continued)

OTHER PUBLICATIONS

Vojnovic, S., et al., "Control Access Kernel Functionality Verification in Set-Tip Boxes via Popup Detection," 2011, pp. 1-4.

(Continued)

*Primary Examiner* — Stephen Hong
*Assistant Examiner* — Gregory J Vaughn
(74) *Attorney, Agent, or Firm* — Cahn & Samuels, LLP

(57) ABSTRACT

An embodiment of the invention provides a method where a file is displayed on a display screen of a mobile device; and, a pop-up is identified outside of the visible area on the display screen of the mobile device. The identification of the pop-up includes detecting a document object model change in the file, the presence of one or more non-active elements in the file, and/or a change in luminance in an area outside of the visible area on the display screen. A controller moves the pop-up to the visible area on the display screen, or the visible area on the display screen is moved to the pop-up.

20 Claims, 6 Drawing Sheets

(56) References Cited

U.S. PATENT DOCUMENTS

| | | | |
|---|---|---|---|
| 2011/0314408 A1* | 12/2011 | Yolleck | G06F 17/30873 715/777 |
| 2012/0002149 A1* | 1/2012 | Katoh | G01J 1/06 349/139 |
| 2012/0062622 A1* | 3/2012 | Koyama | G09G 3/3406 345/690 |
| 2013/0033618 A1* | 2/2013 | Kato | G06T 7/0046 348/234 |
| 2014/0240377 A1* | 8/2014 | Matsui | G09G 3/3406 345/690 |

OTHER PUBLICATIONS

Anonymous, "An Operable Pop-Up Preview Feature for Scroll Bar," ip.com, May 10, 2011, pp. 1-6.

Anonymous, "Scroll Bar with Web Page Elements Indicators," Oct. 14, 2010, pp. 1-8.

* cited by examiner

DETECTION AND REPOSITIONING OF POP-UP DIALOGS

This patent application is a continuation application of U.S. patent application Ser. No. 13/725,694 filed on Dec. 21, 2012, which is hereby incorporated by reference.

BACKGROUND

The present invention is in the field of systems, devices, methods, and computer program products for the detection and repositioning of pop-up dialogs.

Many mobile devices, such as smart phones and tablet computers, have the capability of accessing and displaying files, applications, and/or web pages. Due to the portable sizes of such mobile devices, display screens often display only a portion of the web page. In order to navigate or zoom in or out of a web page, a user can enter input, for example, via arrow keys, scroll bars, or touch screen commands. Display screens can also be adjusted by tilting or rotating the mobile devices.

SUMMARY OF THE INVENTION

An embodiment of the invention provides a method where a file is displayed on a display screen of a mobile device; and, a pop-up is identified outside of the visible area on the display screen of the mobile device. The identification of the pop-up includes detecting a document object model change in the file, the presence of one or more non-active elements in the file, and/or a change in luminance in an area outside of the visible area on the display screen. A controller moves the pop-up to the visible area on the display screen, or the visible area on the display screen is moved to the pop-up.

BRIEF DESCRIPTION OF THE SEVERAL VIEWS OF THE DRAWINGS

The present invention is described with reference to the accompanying drawings. In the drawings, like reference numbers indicate identical or functionally similar elements.

DETAILED DESCRIPTION

Figure 1:
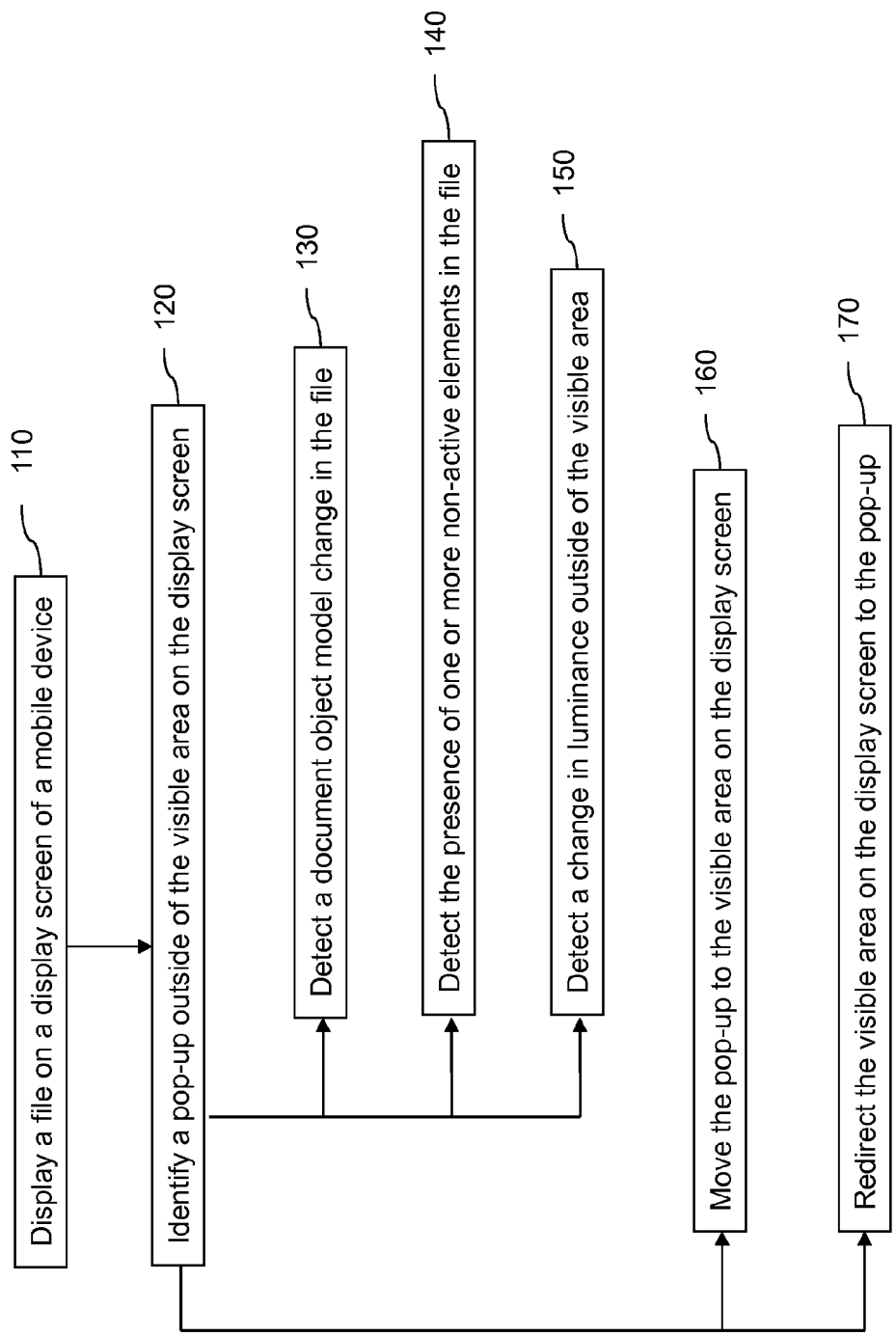
FIG. 1 is a flow diagram illustrating a method for displaying a pop-up according to an embodiment of the invention.

Exemplary, non-limiting, embodiments of the present invention are discussed in detail below. While specific configurations are discussed to provide a clear understanding, it should be understood that the disclosed configurations are provided for illustration purposes only. A person of ordinary skill in the art will recognize that other configurations may be used without departing from the spirit and scope of the invention.

An embodiment of the invention provides a method to detect when a web page pop-up (also referred to as a "pop-up dialog", "pop-up window", or "secondary window") has been created outside of a user's visible area on a mobile device (e.g., smart phone, tablet computer). After detecting the creation of a non-visible pop-up, the mobile device can either intercept and redirect the pop-up to a visible area on the mobile device's display screen, or redirect the visible area on the display screen to the area of the web page that contains the pop-up. As used herein, the terms "visible area" and "viewable area" include the portion of the file, application, or web page that is displayed on the display screen of the mobile device.

Another embodiment of the invention provides a system that a pop-up dialog that has opened or is attempting to open. The system can also calculate the screen resolution, detect any special mode(s) that the device is in (e.g., zoom factor), detect the coordinates of the pop-up dialog, detect the coordinates that the pop-up dialog is trying to open to, detect whether the pop-up dialog is out of focus, redirect the pop-up dialog to the active viewable area, or move the active viewable area to the pop-up dialog. In at least one embodiment, an information dialog is presented to the user in the active viewable area, where the information dialog informs the user that a pop-up dialog was created elsewhere and gives the user an option to move the viewable area of the screen. In another embodiment, the system utilizes user preferences for pop-up placement and/or viewable area shifting. The system allows an application developer to focus on application logic without requiring device specific application windows placement logic inside the code. Moreover, the system reduces the development time and increases the usability for the consumer.

The creation of a non-visible pop-up dialog can be detected by detecting a document object model (DOM) change through a browser modification or plugin. In another embodiment, the creation of a non-visible pop-up dialog can be detected by detecting a model pop-up (by inference) and by probing for non-active elements (e.g., fields, scroll bars, buttons). The creation of a non-visible pop-up dialog can also be detected by detecting luminance changes within a display screen.

In order to detect pop-up dialogs, the system can obtain the current screen resolution, the current window placement user preferences, and perform either a cooperative process, an active process, or a luminance change process. The cooperative process sets a global variable for the HyperText Markup Language (HTML) page (e.g., via javascript), which indicates the current visible window placement and size/zoom factor. This process monitors for an HTML pop-up window event, determines whether the pop-up window script honors the global variable, and voluntarily sets the pop-up window location.

In at least one embodiment, the cooperative process detects multiple DOM values and state changes. The DOM values can include the height and width, the location of the visible area, and the scale, etc.; and, the state changes can include window resize and device rotation. The cooperative process can also detect the disabling of certain browser capabilities, which can include scrolling, resizing (unless the device rotates), the right mouse button, and/or the back button.

The active process can monitor for an HTML pop-up window event (e.g., by inference) by probing for non-active elements, such as fields, scroll bars, and buttons. In at least one embodiment, the luminance change process measures and records the luminance of pixels on the web page at load time (i.e., the instance where the web page is loaded onto the mobile device) across the viewport. As used herein, the term "viewport" includes the total area of a web page, file, or document. Thus, the viewport can be larger than the area that is visible on the display screen. In at least one embodiment, the luminance of all of the pixels in the viewport is measured and recorded.

The luminance of the pixels can be measured periodically, when a web page is refreshed, and/or when a new web page is loaded. If the luminance of a threshold number and/or percentage of pixels has changed (e.g., 2%), then the pixels(s) and/or area of the viewport where the change occurred can be recorded. The coordinates of the unchanged area(s) can also be recorded. If the pixels where the luminance change occurred are proximate one another or in a consecutive area (i.e., no intermediate areas of no luminance change), then the area can be tagged as a pop-up. Consecutive areas of luminance change are typically in the shape of a rectangle. If exact coordinates of the changed pixels cannot be identified, the system can estimate the coordinates of the changed pixels and/or identify the quadrant of luminance change.

To move the pop-up to the visible area, the current visible area of the file (e.g., x and y coordinates) is determined after a pop-up is detected. A script injection technique can be used or a function can be embedded into the rendering engine that replaces the pop-up location coordinates with a value that is in the relative center of the visible area. For example, the Firefox script monkey (available from Mozilla Corporation, Mountain View, Calif., USA) can be used as a script injection technique.

To move the visible area of the display screen to the pop-up, the pop-up's rendered location (e.g., x and y coordinates) and/or relative center location can be determined. The viewable area window is moved to overlap the pop-up. In other words, the center of the visible area of the display screen is modified to match the coordinates of the pop-up center.

In at least one embodiment of the invention, if the pop-up extends beyond the visible window, then the zoom factor of the display screen is adjusted to incorporate the entire pop-up. In another embodiment, the visible window is moved to display the pop-up window title bar and/or the first editable field and/or button.

FIG. 1 is a flow diagram illustrating a method for displaying a pop-up according to an embodiment of the invention. A file is displayed on a display screen of a mobile device (e.g., smart phone, tablet computer, laptop computer) 110. As used herein, the term "file" includes a document, web page, or computer application. A pop-up is identified outside of a visible area on the display screen of the mobile device (also referred to herein as the "visible window" or "viewable area") 120.

Figure 2:
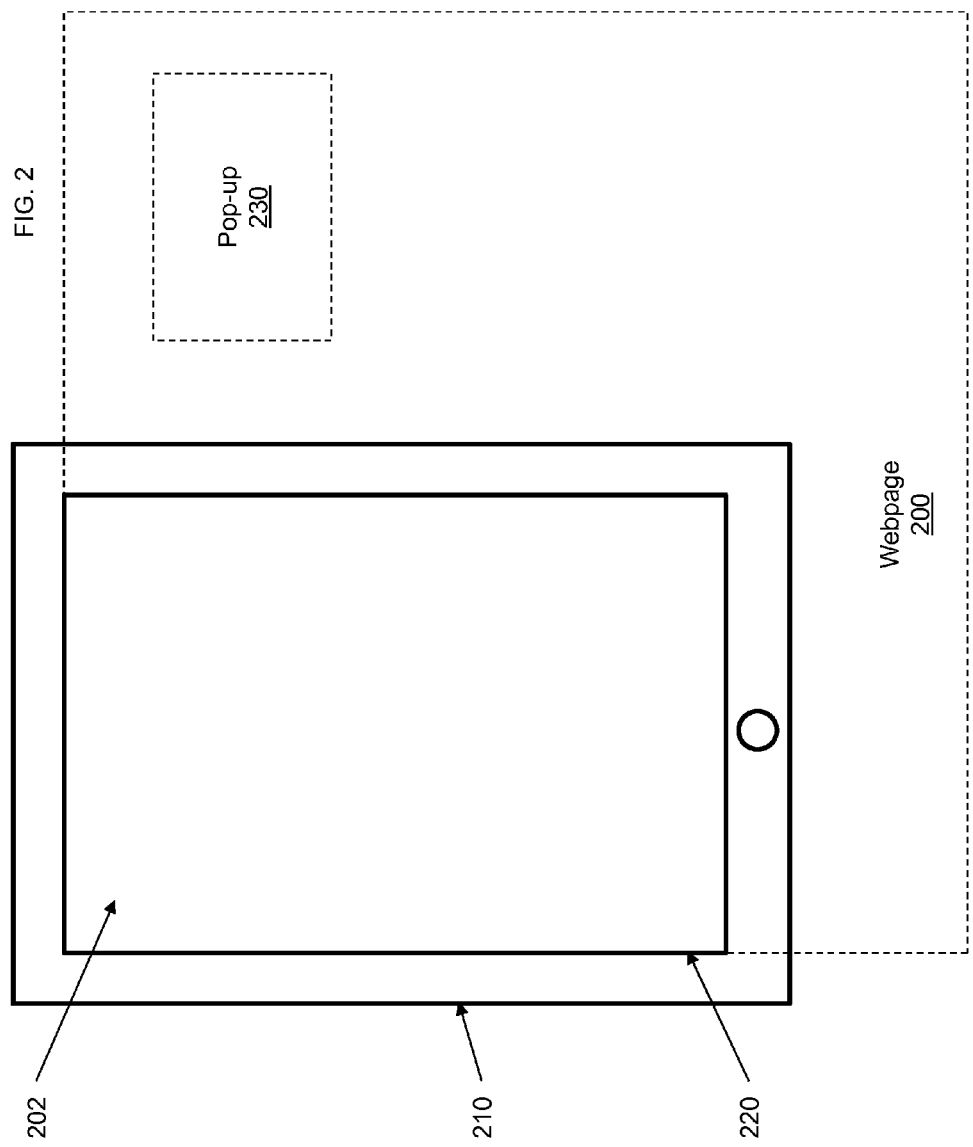
FIG. 2 illustrates a web page being displayed on a mobile device according to an embodiment of the invention.

For example, as illustrated in FIG. 2, a web page 200 is downloaded onto a mobile telephone 210. Due to the size of the web page 200 and the size of the display screen 220 of the mobile telephone 210, only the upper left portion of the web page 200 is in the viewable area 202 of the web page 200. In other words, only the upper left portion of the web page 200 can be displayed in the display screen 220 of the mobile telephone 210. A pop-up 230 is present on the web page 200. However, due to the sizes of the web page 200 and the display screen 220, the pop-up is outside of the visible area on the display screen 220.

In at least one embodiment, the pop-up is identified by detecting a document object model change in the file 122. The document object model change can be a browser modification and/or a browser plug-in. Additionally, the document object model change can be a change in the height of the file, the width of the file, the scale of the file, the screen resolution of the file, and/or the location of the visible area of the file. The document object model change can also be a change in browser capability (e.g., scrolling, resizing, key commands, and/or button commands).

The document object model change can be detected by setting a global variable for a HyperText Markup Language (HTML) page, wherein the global variable indicates the current visible window placement, a size factor, and a zoom factor. The web page can be compared to the global variable such that it can be determined that the document object model has changed if the web page does not match the global variable.

In another embodiment, the pop-up is identified by detecting the presence of one or more non-active elements in the file 124. The non-active elements can include fields, scroll bars, buttons, and/or icons in the file. In yet another embodiment, the pop-up is identified by detecting a change in luminance in the area outside of the visible area on the display screen 126.

More specifically, in at least one embodiment, the luminance of the pixels in the file is determined at the time the file is loaded onto the mobile device; and, the luminance of the pixels in the file is determined at a subsequent time. The subsequent time can be a predetermined time from the time that the file was loaded onto the mobile device. For example, the luminance of the pixels in the file can be measured every 60 seconds (or some other predetermined sampling period) after the file is downloaded and displayed on the mobile device. In another embodiment, the luminance of the pixels in the file can be measured every time that the file is refreshed. The luminance of the pixels in the file at the time the file was loaded onto the mobile device is compared with the luminance of pixels in the file at the subsequent time. The pixels in the file that are detected as having a luminance change are identified as a pop-up.

Figure 3:
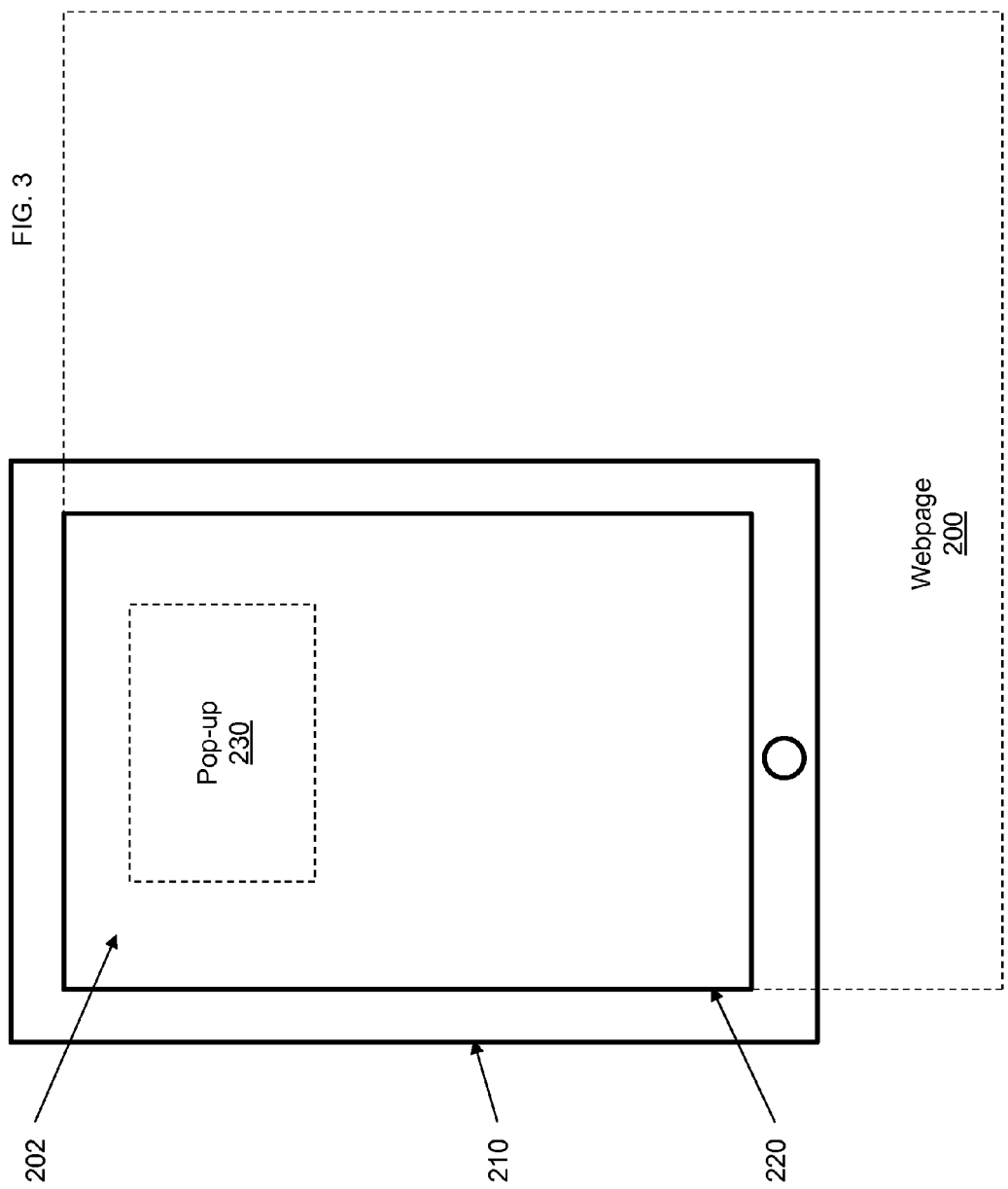
FIG. 3 illustrates the mobile device shown in FIG. 2, wherein the pop-up is moved to the visible area.
Figure 4:
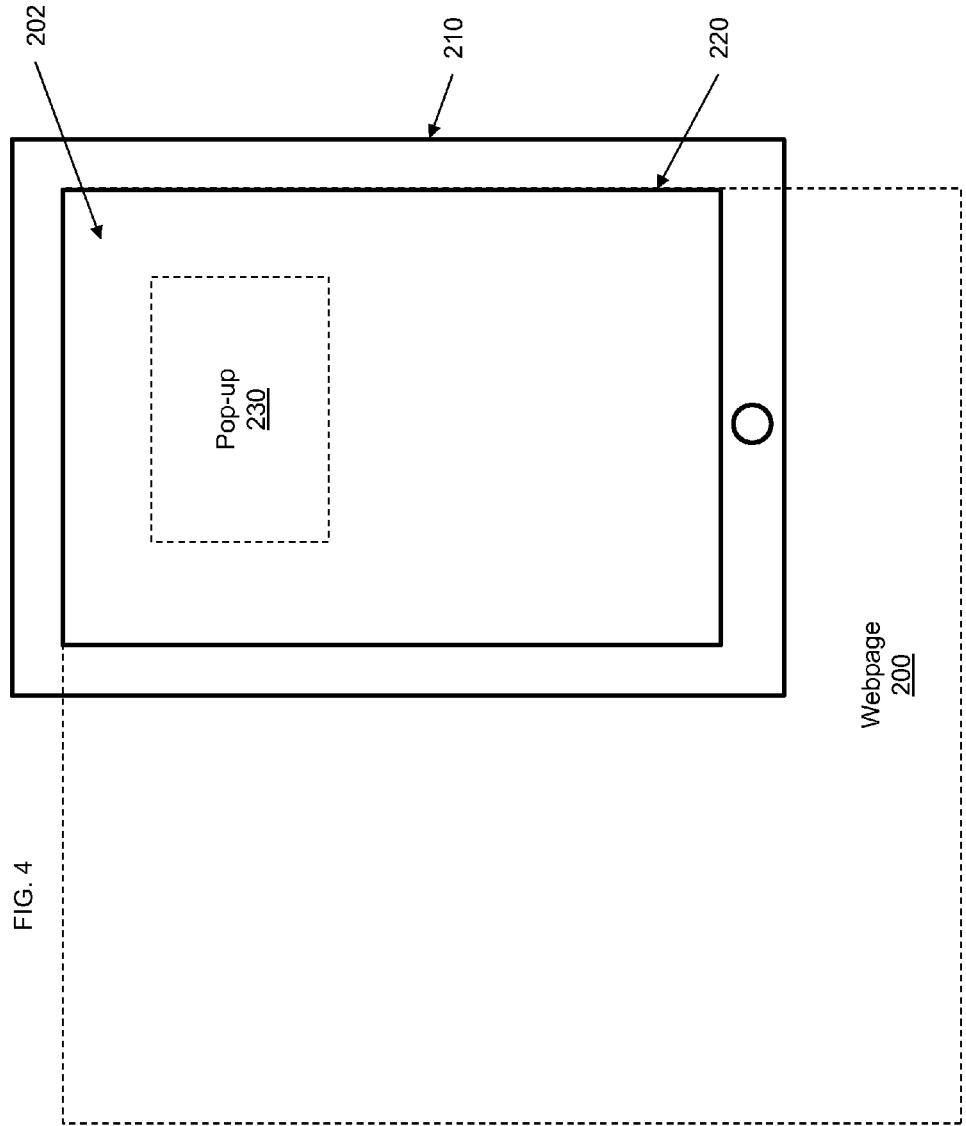
FIG. 4 illustrates the mobile device shown in FIG. 2, wherein the visible area is moved to the pop-up location.

In at least one embodiment of the invention, a controller moves the pop-up to the visible area on the display screen 130A. For example, as illustrated in FIG. 3, the pop-up 230 is moved to the viewable area 202 of the web page 200 (i.e., in the display screen 220). In another embodiment, the controller redirects the visible area on the display screen to the pop-up 130B. For example, as illustrated in FIG. 4, the visible area on the display screen 220 is automatically shifted to the right of the web page 200 such that the pop-up 230 is viewable in the display screen 220.

Figure 5:
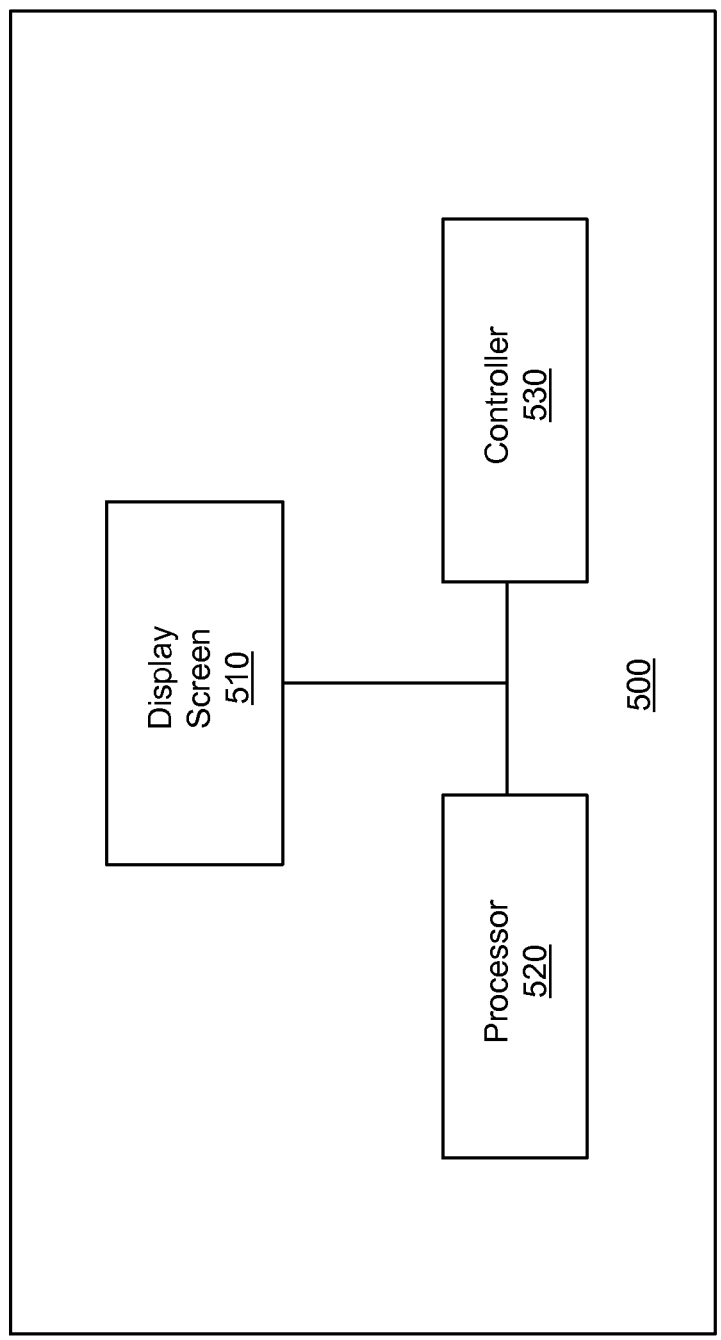
FIG. 5 illustrates a system for displaying a pop-up according to an embodiment of the invention.

FIG. 5 illustrates a system 500 (also referred to herein as the "device") for displaying a pop-up according to an embodiment of the invention. The system 500 includes a display screen 510 for displaying a file on a mobile device, wherein the display screen is connected to a processor 520. As used herein, the term "processor" includes a hardware computing device that identifies a pop-up outside of the visible area of a display screen. As used herein, the term "connected" includes operationally connected, logically connected, in communication with, physically connected, engaged, coupled, contacts, linked, affixed, and attached.

The processor 520 detects a document object model change in the file, the presence of one or more non-active elements in the file (e.g., fields, scroll bars, and/or buttons), and/or a change in luminance in an area outside of the visible area on the display screen 510. More specifically, the processor 520 can detect a browser modification and/or a browser plug-in. Furthermore, the processor 520 can detect a change in the height of the file, the width of the file, the location of the visible area of the file, the scale of the file, the resolution of the file, and/or a change in a browser capability (e.g., scrolling, resizing, key commands, and/or button commands).

In at least one embodiment of the invention, the processor 520 sets a global variable for a HyperText Markup Language page and determines whether a webpage matches the global variable. The global variable can indicate the current visible window placement, the size factor, and/or the zoom factor.

In another embodiment, the processor 520 determines the luminance of the pixels in the file at the time that the file is loaded onto the mobile device, and determines the luminance of the pixels in the file at a subsequent time. The subsequent time can be a predetermined time from the time that the file was loaded onto the mobile device and/or a time when the file is refreshed. The processor 520 can compare the luminance of the pixels in the file at the subsequent time with the luminance of pixels in the file at the time the file was loaded onto the device. Thus, the processor 520 can identify pixels in the file having a luminance change as a pop-up.

The processor 520 is connected to a controller 530. As used herein, the term "controller" includes a hardware computing device that can move the pop-up to the visible area on the display screen 510 or move the visible area on the display screen 510 to the pop-up.

As will be appreciated by one skilled in the art, aspects of the present invention may be embodied as a system, method or computer program product. Accordingly, aspects of the present invention may take the form of an entirely hardware embodiment or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 6:
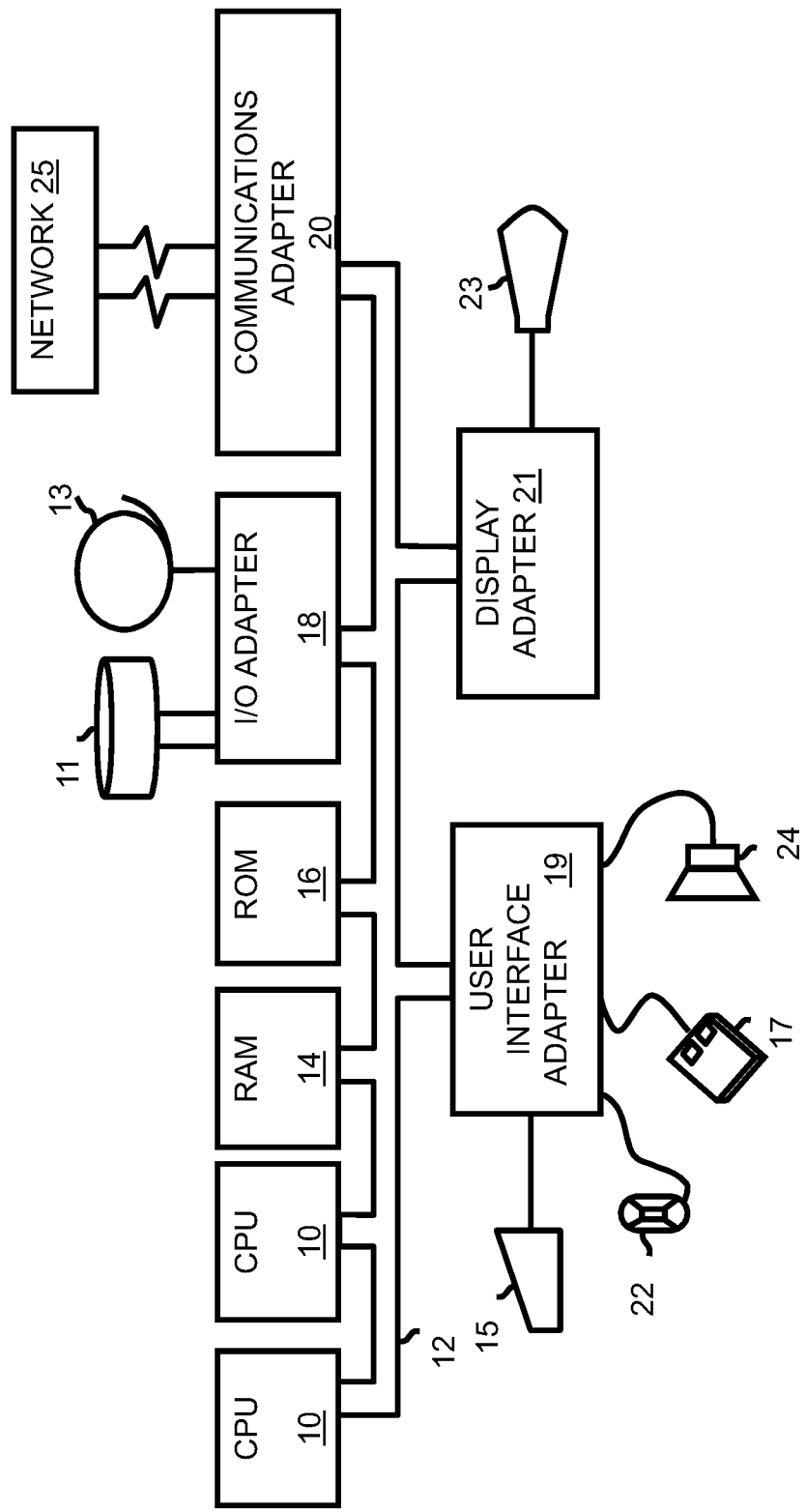
FIG. 6 illustrates a computer program product according to an embodiment of the invention.

Referring now to FIG. 6, a representative hardware environment for practicing at least one embodiment of the invention is depicted. This schematic drawing illustrates a hardware configuration of an information handling/computer system in accordance with at least one embodiment of the invention. The system comprises at least one processor or central processing unit (CPU) 10. The CPUs 10 are interconnected with system bus 12 to various devices such as a random access memory (RAM) 14, read-only memory (ROM) 16, and an input/output (I/O) adapter 18. The I/O adapter 18 can connect to peripheral devices, such as disk units 11 and tape drives 13, or other program storage devices that are readable by the system. The system can read the inventive instructions on the program storage devices and follow these instructions to execute the methodology of at least one embodiment of the invention. The system further includes a user interface adapter 19 that connects a keyboard 15, mouse 17, speaker 24, microphone 22, and/or other user interface devices such as a touch screen device (not shown) to the bus 12 to gather user input. Additionally, a communication adapter 20 connects the bus 12 to a data processing network 25, and a display adapter 21 connects the bus 12 to a display device 23 which may be embodied as an output device such as a monitor, printer, or transmitter, for example.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the root terms "include" and/or "have", when used in this specification, specify the presence of stated features, integers, steps, operations, elements, and/or components, but do not preclude the presence or addition of at least one other feature, integer, step, operation, element, component, and/or groups thereof.

The corresponding structures, materials, acts, and equivalents of all means plus function elements in the claims below are intended to include any structure, or material, for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A system, comprising:
    a display screen, said display screen displays a file on a device;
    a processor connected to said display screen, said processor identifies a pop-up outside of a visible area on said display screen, said processor at least one of:
        detects a document object model change in the file,
        detects a presence of at least one non-active element in the file, and
        detects a change in luminance in an area outside of the visible area on said display screen; and
    a controller connected to said processor, said controller determines a rendered location of the pop-up, the rendered location including x and y coordinates, and moves the visible area on said display screen to the rendered location of the pop-up, such that a center of the visible area of said display screen is modified to match the x and y coordinates of the pop-up.

2. The system according to claim 1, wherein said processor detects at least one of a browser modification and a browser plug-in.

3. The system according to claim 1, wherein said processor detects a change in at least one of a height of the file, a width of the file, a location of a visible area of the file, a scale of the file, a resolution of the file, and a change in a browser capability.

4. The system according to claim 3, wherein the browser capability includes at least one of scrolling, resizing, key commands, and button commands.

5. The system according to claim 1, wherein said processor:
    sets a global variable for a HyperText Markup Language (HTML) page, the global variable indicating a current visible window placement, a size factor, and a zoom factor; and
    determines whether a webpage matches the global variable.

6. The system according to claim 1, wherein the at least one non-active element includes at least one of fields, scroll bars, and buttons.

7. The system according to claim 1, wherein said processor:
    determines luminance of pixels in the file at a time the file is loaded onto the device;
    determines luminance of the pixels in the file at a subsequent time, the subsequent time including at least one of:
        a predetermined time from the time that the file was loaded onto the device, and
        a time when the file is refreshed; and
    compares the luminance of the pixels in the file at the subsequent time with the luminance of pixels in the file at the time the file was loaded onto the device.

8. The system according to claim 7, wherein said processor identifies pixels in the file having a luminance change as a pop-up.

9. The system according to claim 1, wherein said display screen displays an information dialog to the user, the information dialog informs the user that a pop-up dialog was created and gives the user an option to move the visible area on said display screen.

10. The system according to claim 1, wherein user preferences are utilized for at least one of pop-up placement and viewable area shifting.

11. The system according to claim 1, wherein a zoom factor of said display screen is adjusted to incorporate an entire pop-up when the pop-up extends beyond the visible window.

12. A device comprising:
a display screen having a first size, said display screen displays a webpage having a second size, the second size being larger than the first size;
a processor connected to said display screen, said processor identifies a pop-up on the webpage, the pop-up being located outside of a visible area on said display screen, said processor detects:
a document object model change in the webpage,
a presence of at least one non-active element in the webpage, and
a change in luminance in an area outside of the visible area on said display screen; and
a controller connected to said display screen, said controller determines a rendered location of the pop-up, the rendered location including x and y coordinates, and moves the visible area on said display screen to the rendered location of the pop-up, such that a center of the visible area of said display screen is modified to match the x and y coordinates of the pop-up.

13. The device according to claim 12, wherein said processor detects a browser modification and a browser plug-in.

14. The device according to claim 12, wherein said processor detects a change in a height of the webpage, a width of the webpage, a location of a visible area of the webpage, a scale of the webpage, a resolution of the webpage, and a change in a browser capability.

15. The device according to claim 12, wherein said processor:
sets a global variable for a HyperText Markup Language (HTML) page, the global variable indicating a current visible window placement, a size factor, and a zoom factor; and
determines whether a webpage matches the global variable.

16. The device according to claim 12, wherein the at least one non-active element includes fields, scroll bars, and buttons.

17. The device according to claim 12, wherein said processor:
determines luminance of pixels in the webpage at a time the webpage is loaded onto the device;
determines luminance of the pixels in the webpage at a subsequent time, the subsequent time including:
a predetermined time from the time that the webpage was loaded onto the device, and
a time when the webpage is refreshed; and
compares the luminance of the pixels in the webpage at the subsequent time with the luminance of pixels in the webpage at the time the webpage was loaded onto the device.

18. A device comprising:
a display screen having a first size, said display screen displays a webpage having a second size, the second size being larger than the first size;
a processor connected to said display screen, said processor identifies a pop-up on the webpage, the pop-up being located outside of a visible area on said display screen, said processor detects at least one of:
a document object model change in the webpage,
a presence of at least one non-active element in the webpage, and
a change in luminance in an area outside of the visible area on the display screen; and
a controller connected to said processor, said controller determines a rendered location of the pop-up, the rendered location including x and y coordinates, and moves the visible area on said display screen to the rendered location of the pop-up, such that a center of the visible area of said display screen is modified to match the x and y coordinates of the pop-up.

19. The device according to claim 18, wherein said processor detects at least one of a browser modification and a browser plug-in.

20. A computer program product comprising:
a non-transitory computer readable storage medium;
first program instructions to display a file on a display screen of a device, the display screen having a first size, the display screen displays a webpage having a second size larger than the first size;
second program instructions to identify a pop-up on the webpage, the pop-up being located outside of a visible area on the display screen of the device, said identifying of the pop-up including at least one of:
detecting a document object model change in the file,
detecting a presence of at least one non-active element in the file, and
detecting a change in luminance in an area outside of the visible area on the display screen; and
third program instructions to determine a rendered location of the pop-up, the rendered location including x and y coordinates, and move the visible area on said display screen to the rendered location of the pop-up, such that a center of the visible area of said display screen is modified to match the x and y coordinates of the pop-up,
said first program instructions, said second program instructions, and said third program instructions are stored on said computer readable storage medium.

\* \* \* \* \*